(12) United States Patent
McCullough (10) Patent No.: US 11,111,938 B2
(45) Date of Patent: Sep. 7, 2021

(54) AXIAL PRELOADING DEVICE

(71) Applicant: Sikorsky Aircraft Corporation, Stratford, CT (US)

(72) Inventor: Paul McCullough, Harwinton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 613 days.

(21) Appl. No.: 15/913,558

(22) Filed: Mar. 6, 2018

(65) Prior Publication Data

US 2019/0277321 A1    Sep. 12, 2019

(51) Int. Cl.
*F16B 2/14*    (2006.01)
*F16B 7/18*    (2006.01)

(52) U.S. Cl.
CPC .............. *F16B 2/14* (2013.01); *F16B 7/18* (2013.01); *Y10T 403/7067* (2015.01)

(58) Field of Classification Search
CPC .......... F15B 15/1428; F16B 2/14; F16B 7/18; F16B 7/182; Y10T 403/1683; Y10T 403/4617; Y10T 403/4674; Y10T 403/4685; Y10T 403/4688; Y10T 403/556; Y10T 403/7041; Y10T 403/7049; Y10T 403/7051; Y10T 403/7067; Y10T 403/76
USPC ......... 403/21, 236, 256, 260, 261, 296, 362, 403/366, 367, 374.3, 409.1
See application file for complete search history.

(56) References Cited

U.S. PATENT DOCUMENTS

| 3,633,949 A | * | 1/1972 | Pfluger | F16B 2/14 |
| | | | | 403/374.3 |
| 4,396,310 A | * | 8/1983 | Mullenberg | F16D 1/095 |
| | | | | 403/373 |
| 5,360,283 A | | 11/1994 | Browning et al. | |
| 5,374,135 A | * | 12/1994 | Folsom | F16D 1/094 |
| | | | | 403/362 |
| 7,008,170 B2 | | 3/2006 | Proveaux et al. | |

FOREIGN PATENT DOCUMENTS

| CA | 2715892 A1 | * | 3/2012 | ................ F16B 39/10 |
| CA | 2885026 A1 | * | 1/2016 | ................ F16B 7/182 |
| DE | 102013224191 A1 | * | 5/2015 | ................ F16D 1/087 |
| JP | 2004108497 A | * | 4/2004 | ................ F16B 7/182 |
| WO | WO-2015056308 A1 | * | 4/2015 | ................ F16B 2/14 |

* cited by examiner

*Primary Examiner* — Josh Skroupa
(74) *Attorney, Agent, or Firm* — Foley & Lardner LLP (57) ABSTRACT

An axial preloading device can include a shell having an inner surface that defines a radially interior channel, the inner channel defining an axial direction, one or more moveable housing members disposed at least partially within the interior channel and configured to move relative to the shell in the axial direction, and a wedge assembly connected to the shell and disposed in contact with the one or more housing members. The wedge assembly can be configured to be moved radially relative to the shell and the one or more housing members to push the one or more housing members axially. The wedge assembly and the one or more housing members define a shaft opening when installed on the shell.

17 Claims, 8 Drawing Sheets

AXIAL PRELOADING DEVICE

BACKGROUND

1. Field

The present disclosure relates to preloading systems, more specifically to axial preloading devices.

2. Description of Related Art

A significant preload to the joint between, e.g., a hydraulic cylinder and its mating clevis can be useful to increase the fatigue life of the joint. Such preload can be desirable so long as it does not sacrifice too much cylinder stroke. Conventional methods may not be suitable for use in certain applications due to space, mechanical, and/or safety constraints.

Such conventional methods and systems have generally been considered satisfactory for their intended purpose. However, there is still a need in the art for improved axial preloading devices. The present disclosure provides a solution for this need.

SUMMARY

In accordance with at least one aspect of this disclosure, an axial preloading device can include a shell having an inner surface that defines a radially interior channel, the inner channel defining an axial direction, one or more moveable housing members disposed at least partially within the interior channel and configured to move relative to the shell in the axial direction, and a wedge assembly connected to the shell and disposed in contact with the one or more housing members. The wedge assembly can be configured to be moved radially relative to the shell and the one or more housing members to push the one or more housing members axially. The wedge assembly and the one or more housing members define a shaft opening when installed on the shell.

The interior channel can be circular. For example, the shell can be ring shaped. In certain embodiments, the inner diameter can include a lip such that the shell includes a T shaped cross-section.

The one or more moveable housing members can include a tapered housing surface. In certain embodiments, the tapered housing surface can have a linear taper. In certain embodiments, the one or more moveable housing members can include two housing members disposed on opposite sides of the wedge assembly.

The one or more moveable housing members can be slidably attached to the shell. For example, the one or more moveable housing members are pinned (e.g., via one or more pins) to the lip through one or more pin holes defined in the one or more moveable housing members.

The wedge assembly can include a plurality of wedge nuts configured to be constrained to radial motion. For example, each wedge nut can be threaded to a wedge screw disposed through the shell such that actuation of each screw causes linear radial movement of a respective wedge nut.

In certain embodiments, a shape of the wedge nuts can match the taper of the one or more moveable housing members. The one or more wedge nuts can be segments of an arc. In certain embodiments, a furthest radial inward motion of the one or more wedge nuts can be limited to the diameter of the arc (e.g., because each member would contact and form a circle) and the furthest radially outward motion of the one or more wedge nuts can be limited by the inner surface of the shell.

In accordance with at least one aspect of this disclosure, a joint system can include an axial joint between a first member and a second member and an axial preloading device disposed on the joint between the first member and the second member. The axial preloading device is configured to provide preloading force to bias the first member away from the second member, and can include any embodiment and/or portions thereof in accordance with this disclosure.

In certain embodiments, the first member can be a mounting clevis, and the second member can be a hydraulic cylinder. The joint can include a threaded shaft, for example, attaching the mounting clevis to the hydraulic cylinder.

In accordance with at least one aspect of this disclosure, a method for providing an axial preload to a shaft includes moving one or more wedges of a wedge assembly radially relative to a shell and one or more moveable housing members to push the one or more moveable housing members axially to provide a preload on the shaft. In at least some embodiments, moving the one or more wedges can include turning a screw of at least one of the one or more wedges to cause the one or more moveable housing members to move axially in response to the turning of the screw.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figures 1, 2:
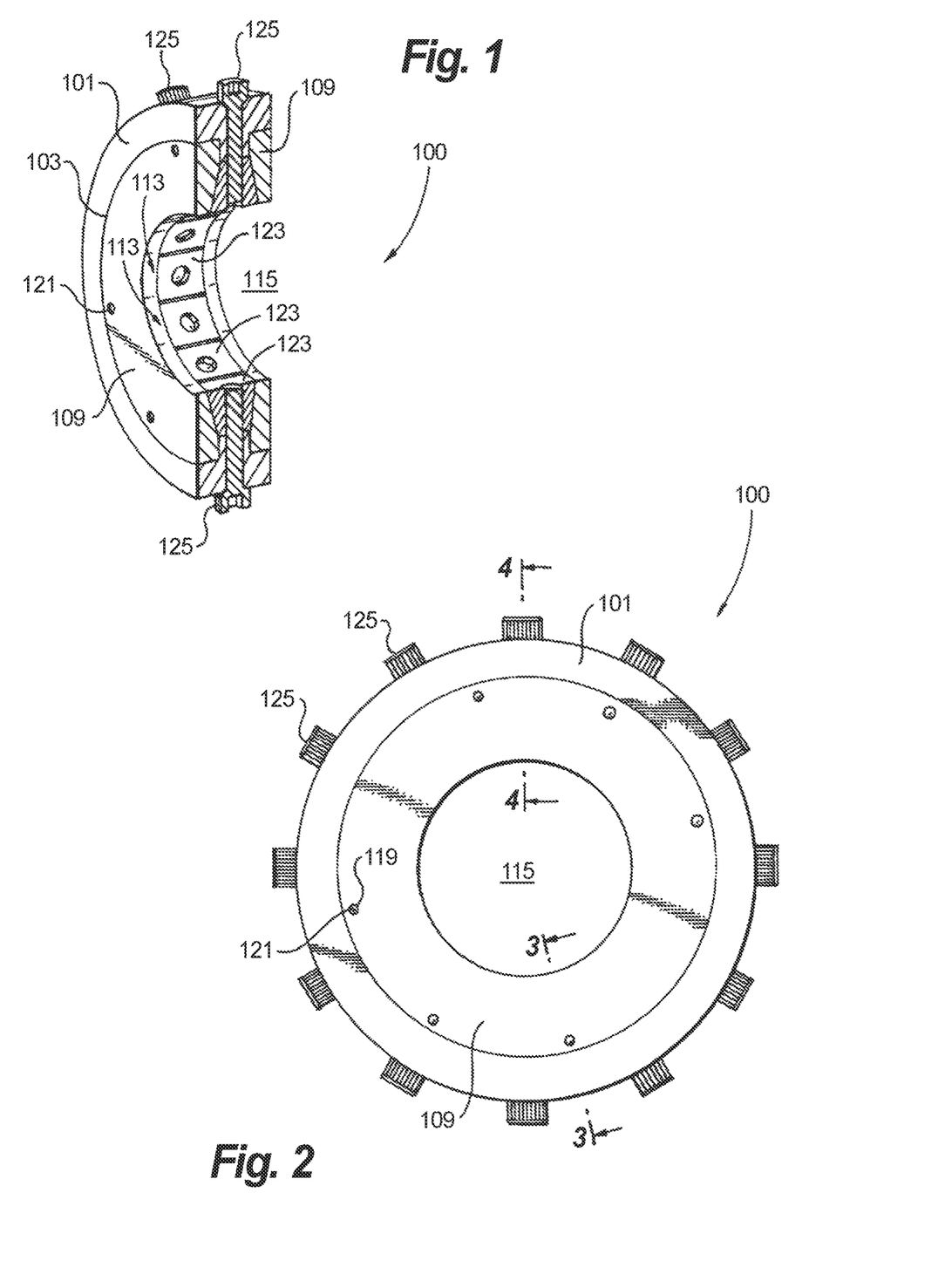
FIG. 1 is a cross-sectional perspective view of an embodiment of a preloading device in accordance with this disclosure.
FIG. 2 is a plan view of the embodiment of FIG. 1.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIGS. 2-13. The systems and methods described herein can be used to provide axial preloading for any suitable joint systems.

Figure 3:
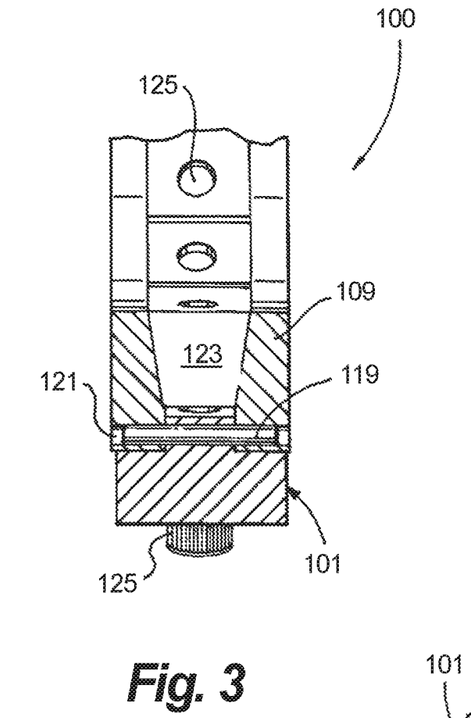
FIG. 3 is a partial cross-sectional view of the embodiment of FIG. 1.
Figure 4:
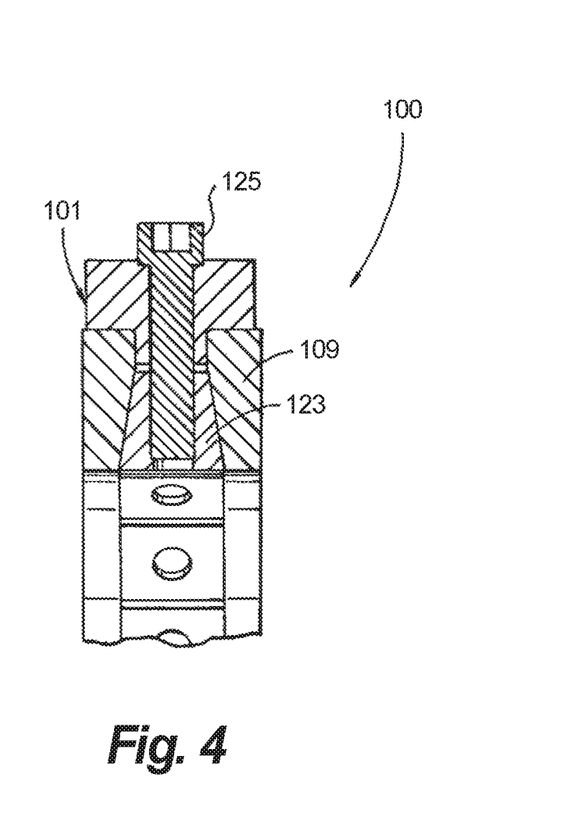
FIG. 4 is a partial cross-sectional view of the embodiment of FIG. 1.
Figure 5:
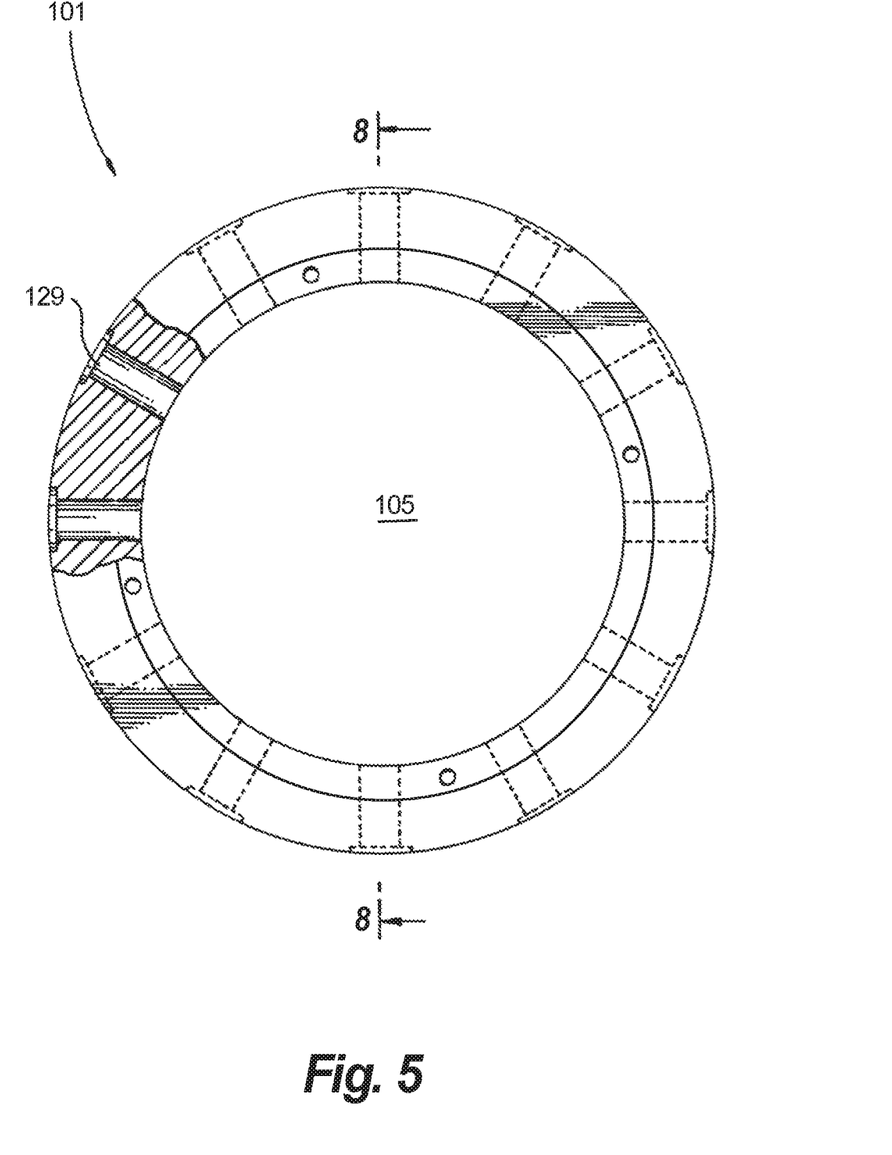
FIG. 5 is a plan view of an embodiment of a shell in accordance with this disclosure.
Figure 6:
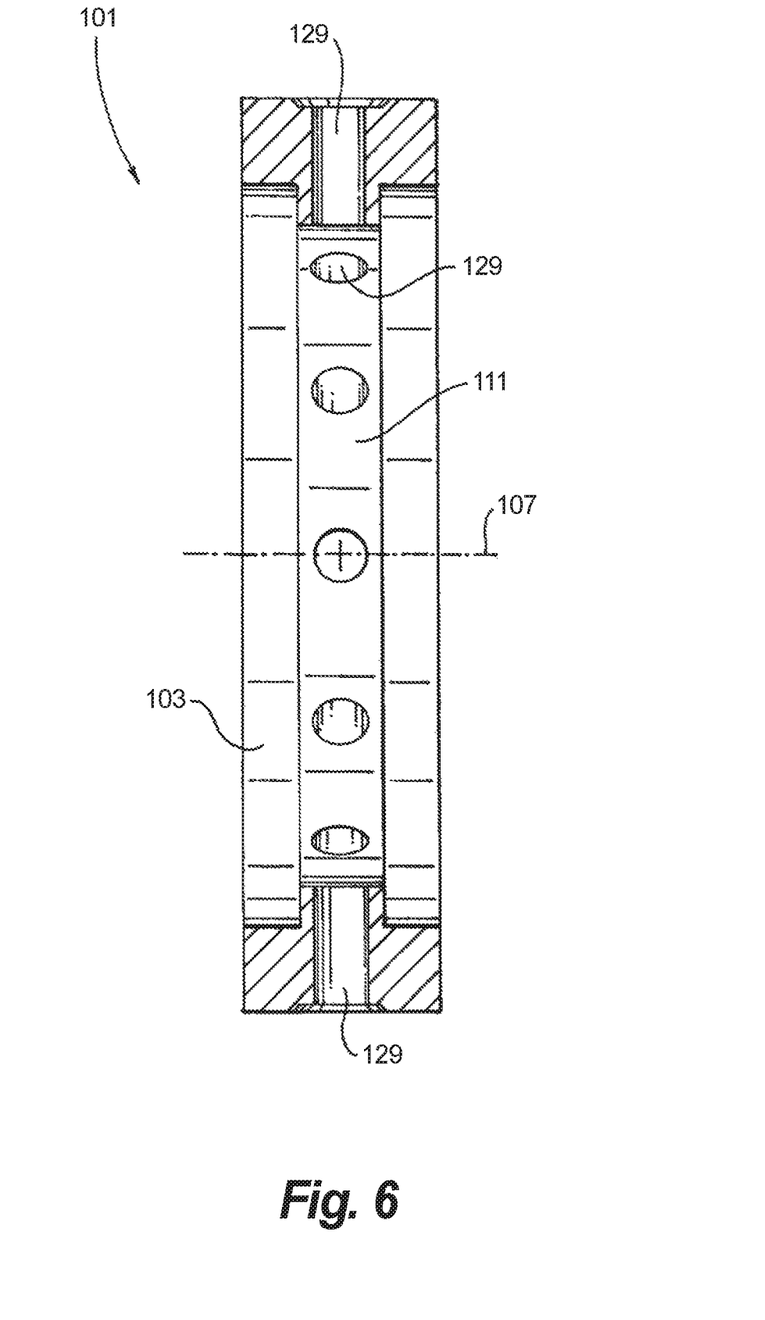
FIG. 6 is a cross-sectional view of the embodiment of FIG. 4.

Referring to FIGS. 1-6, certain embodiments of an axial preloading device 100 can include a shell 101 having an inner surface 103 (e.g., as shown in FIG. 6) that defines a radially interior channel 105 (e.g., as shown in FIG. 5). The inner channel 105 defines an axial direction 107.

Figure 7:
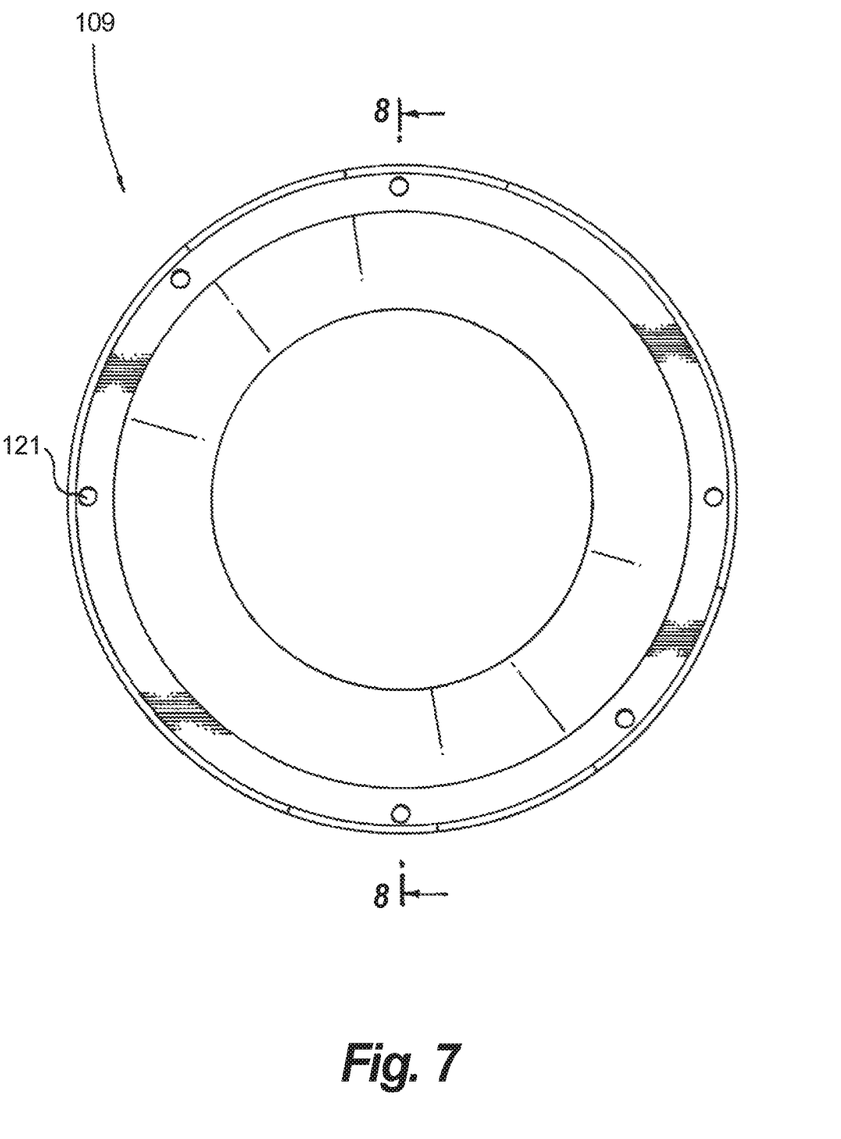
FIG. 7 is a plan view of an embodiment of a moveable housing member in accordance with this disclosure.
Figure 8:
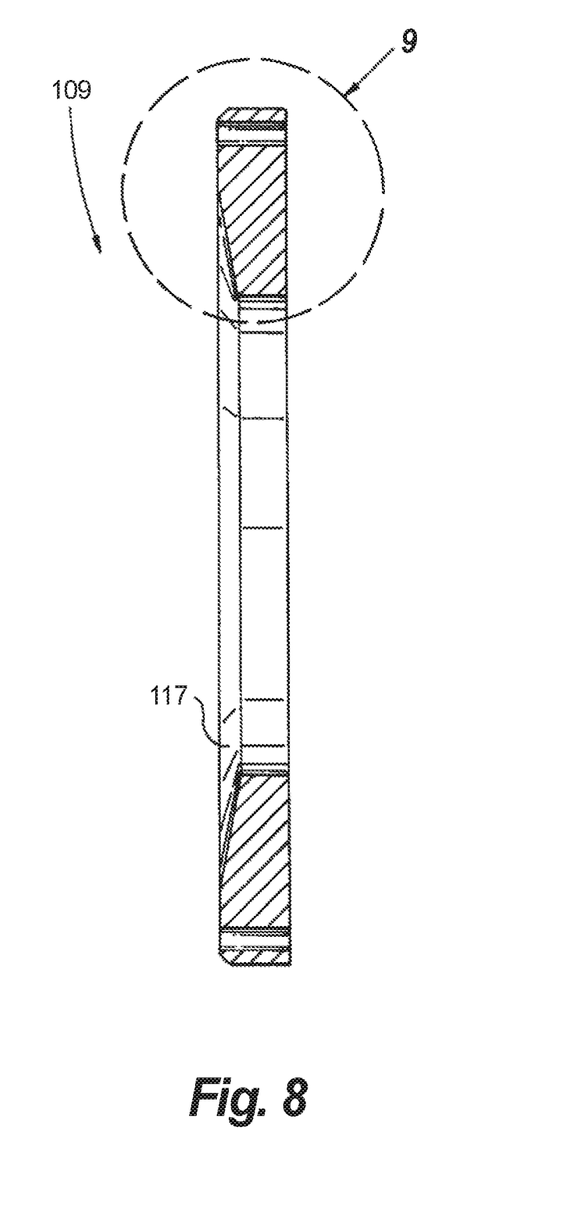
FIG. 8 is a cross-sectional view of the embodiment of FIG. 7.
Figure 9:
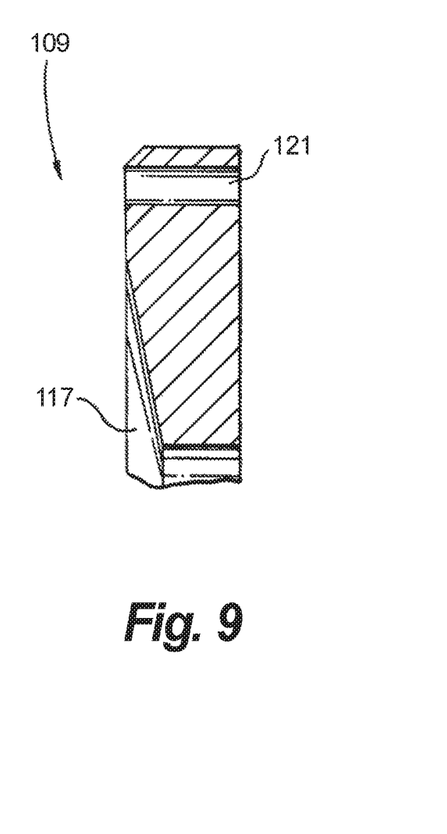
FIG. 9 is a partial cross-sectional view of the embodiment of FIG. 7.
Figure 10:
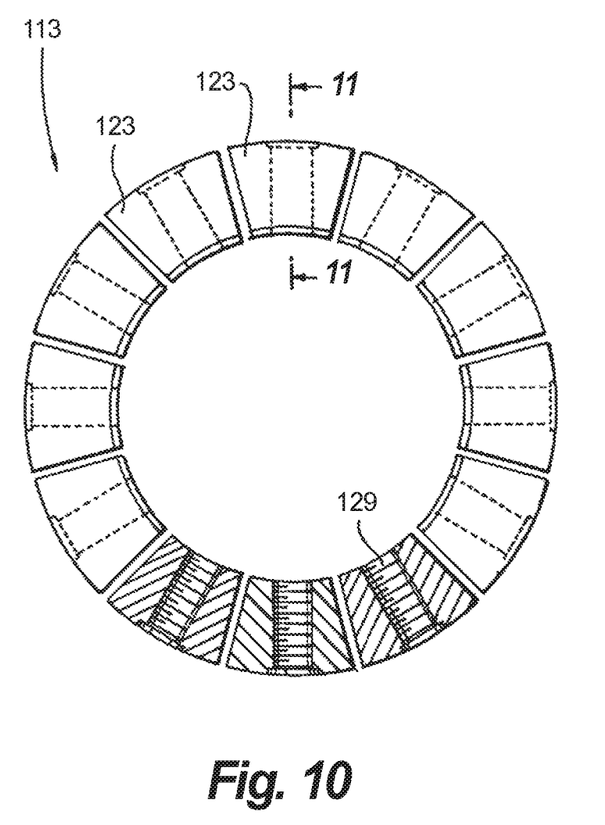
FIG. 10 is a plan view of an embodiment of a wedge assembly in accordance with this disclosure.
Figure 11:
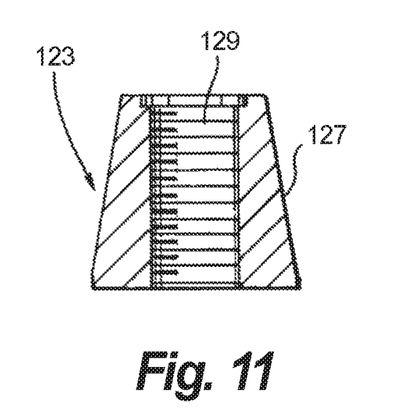
FIG. 11 is a cross-sectional view of an embodiment of a wedge nut in accordance with this disclosure.

Referring additionally to FIGS. 7-9, one or more moveable housing members 109 are disposed at least partially within the interior channel 105 and configured to move relative to the shell 101 in the axial direction 107. Referring additionally to FIGS. 10 and 11, an embodiment of a wedge assembly 113 is shown and can be connected to the shell 101 and disposed in contact with the one or more housing members 109.

The wedge assembly 113 can be configured to be moved radially relative to the shell 101 (e.g., inward toward the center of the interior channel 105 and outward toward the inner surface 103 of the shell 101). The wedge assembly 113 is configured to push the one or more housing members 109 axially. The wedge assembly 113 and the one or more housing members 109 define a shaft opening 115 when installed on the shell 101.

The interior channel 105 of the shell 101 can be circular. For example, the shell 101 can be ring shaped (e.g., an annulus or any suitable annular shape). In certain embodiments, the inner diameter 103 can include a lip 111 such that the shell 101 includes a T shaped cross-section as shown in FIG. 6.

The one or more moveable housing members 109 can include a tapered housing surface 117. In certain embodiments, the tapered housing surface 117 can have a linear taper as shown. Any other suitable taper (e.g., non-linear curve) is contemplated herein.

In certain embodiments, as shown, the one or more moveable housing members 109 can include two housing members 109 disposed on opposite sides of the wedge assembly 113. While each housing member 109 is shown as a solid piece, it is contemplated that each housing member 109 can include any suitable number of pieces (e.g., that form an arc segment which together complete a circle).

The one or more moveable housing members 109 can be slidably attached to the shell 101 (e.g., instead of sitting freely within the shell 101). This can prevent the housing members 109 from falling out of the device 100 during installation of the device 100 around a shaft, for example. In certain embodiments, the one or more moveable housing members 109 can be pinned (e.g., via one or more pins 119) to the lip 111 through one or more pin holes 121 defined in the one or more moveable housing members 109. In certain embodiments, the one or more pins 119 can pass through the lip 111 and act as a linear guide pin for two housing members 109 (e.g., as shown in FIG. 3).

The wedge assembly 113 can include a plurality of wedge nuts 123 configured to be constrained to radial motion (e.g., by virtue of being shaped such that the interaction of the wedge nuts 123 with the housing members 109 prevents rotation of the wedge nuts 123. For example, each wedge nut 123 can be threaded to a wedge screw 125 disposed through the shell 101 (e.g., radially through the shell 101 as shown) such that actuation of each screw 125 causes linear radial movement of a respective wedge nut 123, which, in turn, affects the axial position of the one or more housing members 109.

In certain embodiments, a shape of the wedge nuts 123 can match the taper of the one or more moveable housing members 109, however, any other suitable shape to cause axial actuation of the housing members 109 is contemplated herein. For example, referring to FIG. 11, one or more of the wedge nuts 123 can include a tapered wedge surface 127 that has the same slope as the tapered housing surface 117. Each wedge nut 123 can include a threaded channel 129 for the wedge screw 125 to mesh with (e.g., as shown in FIGS. 1 and 4).

The one or more wedge nuts 123 can be segments of an arc, e.g., that form a circle of a certain radius when contacted together. In certain embodiments, a furthest radial inward motion of the one or more wedge nuts 123 can be limited to the diameter of the arc (e.g., because each member would contact and form a circle when each wedge nut 123 is sufficiently extended). The furthest radially outward motion of the one or more wedge nuts 123 can be limited by the inner surface 103 of the shell 101 (e.g., at the lip 111). The lip 111 can be radially sized based on max preload stress desired such that the wedge nuts 123 bottom out and can no longer push the one or more housing members 109 outward. While embodiments show wedge nuts 123, any suitable wedging assembly for axially actuating the one or more housing members 109 is contemplated herein.

Figure 12:
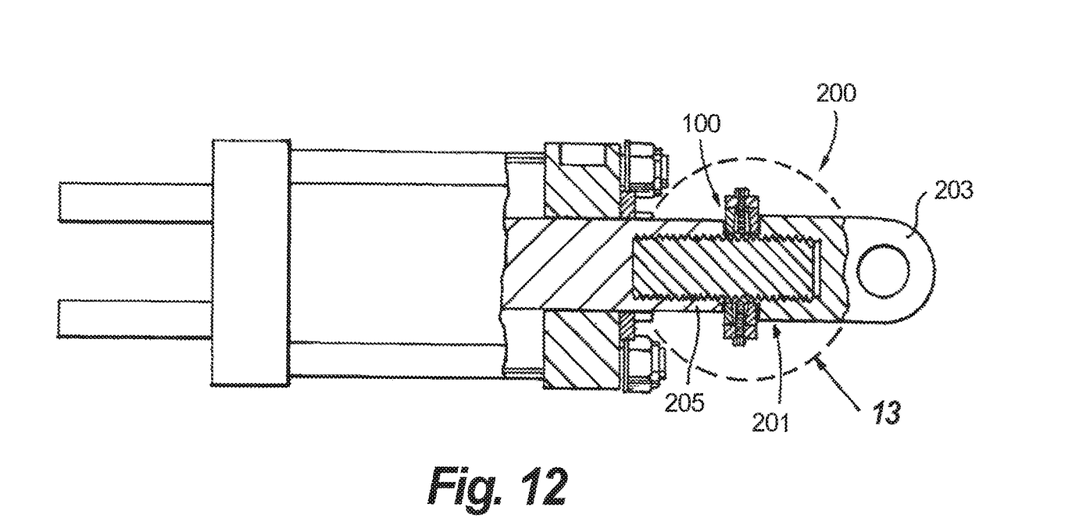
FIG. 12 is a cross-sectional view of an embodiment of a joint system in accordance with this disclosure.
Figure 13:
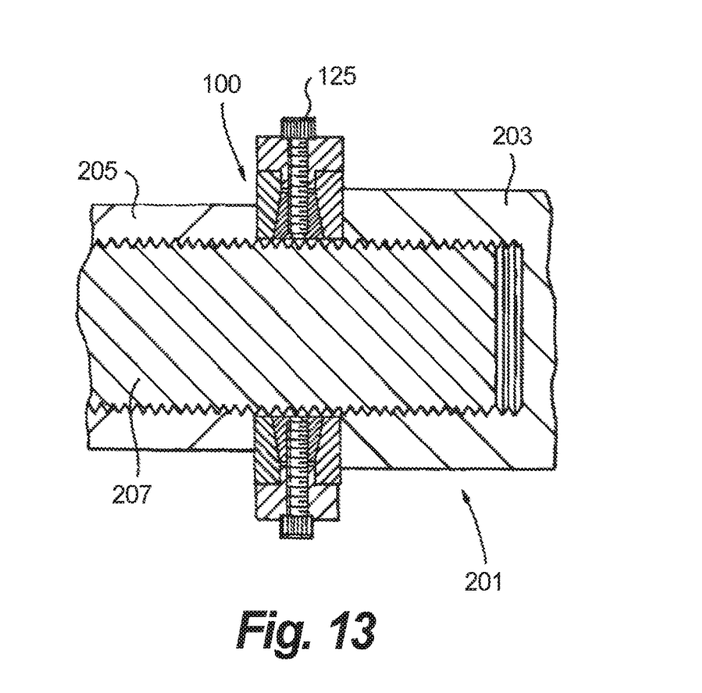
FIG. 13 is a zoomed view of a portion of the embodiment of FIG. 12.

Referring additionally to FIGS. 12 and 13, in accordance with at least one aspect of this disclosure, a joint system 200 can include an axial joint 201 between a first member 203 and a second member 205 and any suitable embodiment of an axial preloading device 100 as described in this disclosure disposed on the joint 201 between the first member 203 and the second member 205. The axial preloading device 100 is configured to provide preloading force to bias the first member 203 away from the second member 205, and can include any embodiment and/or portions thereof in accordance with this disclosure.

In certain embodiments, the first member 203 can be a mounting clevis as shown, and the second member 205 can be a hydraulic cylinder as shown. The joint 201 can include a threaded shaft 207, for example, attaching the mounting clevis to the hydraulic cylinder which can receive the preloading force and is the preloaded component.

In certain embodiments, all parts can be made of steel and lubricant can be applied to wedge nuts and screws to reduce friction. Any other suitable materials and configuration is contemplated herein (e.g., aluminum, polymers).

The number, size, and/or shape of the wedge nuts 123 can be selected by how much preload is desired, for example. The more wedge nuts 123, the more preloading can be achieved. To prevent tilting of the housing members 109, a minimum of three wedge nuts 123 may be utilized. However, embodiments may use less or more (e.g., one, two, twelve).

Any suitable size wedge screws 125 are contemplated herein. Smaller screws 125 allow the device 100 to be thinner, but more wedges and screws may be required for a desired preload if the size of the screws 125 are reduced.

In accordance with at least one aspect of this disclosure, a method for providing an axial preload to a shaft includes moving one or more wedges of a wedge assembly radially relative to a shell and one or more moveable housing members to push the one or more moveable housing members axially to provide a preload on the shaft. In at least some embodiments, moving the one or more wedges can include turning a screw of at least one of the one or more wedges to cause the one or more moveable housing members to move axially in response to the turning of the screw.

In embodiments, preload can be achieved using individual wedge-shaped nuts that are installed in a tapered housing. For example, when the nuts 123 are loaded with screws 125 (e.g., socket head cap screws), an axial preload can be introduced into the joint. A significant preload can be achieved in a relatively tight space so as to not reduce the stroke capacity of the cylinder beyond practical use. Due to the mechanical advantage of the wedge, the axial preload applied is greater than the preload applied using the socket head cap screws. Embodiments allow a significant preload (e.g., greater than 100,000 lbs) which can increase the fatigue life of a joint and can be achieved without sacrificing more than 1.25" of the cylinder stroke of certain systems.

Current environmental, health, and safety (EHS) regulations may prevent working on cylinders while they are pressurized and loaded, and thus spiral washers and other such traditional devices could not be used to preload the cylinder. Embodiments allow significant preloading of the joint without working on the cylinder while it is pressurized. Embodiments can be installed with standard torque wrenches and low torque values, which this makes embodiments economically and ergonomically practical.

Additional applications for certain embodiments include use with a Main Gearbox Servo Pad Clevis preload, Main Rotor Servoactuator preload, Tail Rotor Pitch Change Actuator preload, large bore cylinders-clevis preload, and/or bearing to shaft preload. Any other suitable applications are contemplated herein.

By way of example, aspects of the invention can be used in coaxial helicopters, on tail rotors, or wings or propeller blades on fixed or tilt wing aircraft.

Any suitable combination(s) of any disclosed embodiments and/or any suitable portion(s) thereof is contemplated therein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An axial preloading device, comprising:
   a shell having an annular shape and an inner surface that defines a radially interior channel, the interior channel defining an axial direction;
   one or more moveable housing members disposed at least partially within the interior channel and configured to move relative to the shell in the axial direction; and
   a wedge assembly connected to the shell and disposed in contact with the one or more housing members, wherein the wedge assembly is configured to be moved radially relative to the shell and the one or more housing members to push the one or more housing members axially, wherein the wedge assembly and the one or more housing members define a shaft opening when installed on the shell.

2. The device of claim 1, wherein the interior channel is circular.

3. The device of claim 2, wherein the inner diameter includes a lip such that the shell includes a T shaped cross-section.

4. The system of claim 3, wherein a radial size of the lip is based on a predetermined maximum preload stress.

5. The device of claim 1, wherein the shell is ring shaped.

6. The device of claim 1, wherein the one or more moveable housing members includes a tapered housing surface.

7. The device of claim 6, wherein the tapered housing surface has a linear taper.

8. The device of claim 1, wherein the one or more moveable housing members are slidably attached to the shell.

9. The device of claim 8, wherein the one or more moveable housing members are pinned to a lip through one or more pin holes defined in the one or more moveable housing members.

10. The device of claim 1, wherein the wedge assembly includes a plurality of wedge nuts configured to be constrained to radial motion, each threaded to a wedge screw disposed through the shell such that actuation of each screw causes linear radial movement of a respective wedge nut.

11. The device of claim 10, wherein a shape of the wedge nuts match the taper of the one or more moveable housing members.

12. The device of claim 11, wherein the one or more moveable housing members includes two housing members disposed on opposite sides of the wedge assembly.

13. The device of claim 12, wherein the one or more wedge nuts are segments of an arc.

14. The device of claim 13, wherein a furthest radial inward motion of the one or more wedge nuts is limited to the diameter of the arc, wherein the furthest radially outward motion of the one or more wedge nuts is limited by the inner surface of the shell.

15. A joint system, comprising:
   an axial joint between a first member and a second member; and
   an axial preloading device disposed on the joint between the first member and the second member, wherein the axial preloading device is configured to provide preloading force to bias the first member away from the second member, the device comprising:
   a shell having an annular shape and an inner surface that defines a radially interior channel, the interior channel defining an axial direction;
   one or more moveable housing members disposed at least partially within the interior channel and configured to move relative to the shell in the axial direction; and
   a wedge assembly connected to the shell and disposed in contact with the one or more housing members, wherein the wedge assembly is configured to be moved radially relative to the shell and the one or more housing members to push the one or more housing members axially, wherein the wedge assembly and the one or more housing members define a shaft opening when installed on the shell.

16. The system of claim 15, wherein the first member is a mounting clevis, and the second member is a hydraulic cylinder, and the joint includes a threaded shaft attaching the mounting clevis to the hydraulic cylinder.

17. A joint system, comprising:
   an axial joint between a first member and a second member; and
   an axial preloading device disposed on the joint between the first member and the second member, wherein the axial preloading device is configured to provide preloading force to bias the first member away from the second member, the device comprising:
- a shell having an annular shape and an inner surface that defines a radially interior channel, the interior channel defining an axial direction;
- one or more moveable housing members disposed at least partially within the interior channel and configured to move relative to the shell in the axial direction; and
- a wedge assembly connected to the shell and disposed in contact with the one or more housing members, wherein the wedge assembly is configured to be moved radially relative to the shell and the one or more housing members to push the one or more housing members axially, wherein the wedge assembly and the one or more housing members define a shaft opening when installed on the shell,
- wherein the wedge assembly includes a plurality of wedge nuts configured to be constrained to radial motion, each threaded to a wedge screw disposed through the shell such that actuation of each screw causes linear radial movement of a respective wedge nut, and wherein at least one of a quantity or a size of the plurality of wedge nuts is based on a predetermined maximum preload stress.

* * * * *